(12) United States Patent
Condit (10) Patent No.: US 8,398,062 B1
(45) Date of Patent: Mar. 19, 2013

(54) DOOR HOLDING APPARATUS (76) Inventor: Sterling Wayne Condit, Wellington, KS (US)

(*) Notice: Subject to any disclaimer, the term of this patent is extended or adjusted under 35 U.S.C. 154(b) by 312 days.

(21) Appl. No.: 12/720,930

(22) Filed: Mar. 10, 2010

(51) Int. Cl.
*B23Q 3/02* (2006.01)

(52) U.S. Cl. ............ 269/133; 269/254 R; 269/905

(58) Field of Classification Search .......... 248/122.1, 248/226.11, 166, 172, 676, 649, 670, 671, 248/678, 434, 440; 269/133, 137, 139, 152, 269/203, 254 R, 310, 901, 904, 905, 303, 269/900
See application file for complete search history.

(56) References Cited

U.S. PATENT DOCUMENTS

| 848,837 | A | * | 4/1907 | Schneider et al. | 269/133 |
| 1,429,788 | A | * | 9/1922 | Soliah | 269/133 |
| 1,715,722 | A | * | 6/1929 | Smith et al. | 269/133 |
| 2,830,632 | A | * | 4/1958 | La Rouche | 269/14 |
| 4,695,067 | A | * | 9/1987 | Willey | 280/47.22 |
| 5,048,806 | A | * | 9/1991 | Deutsch et al. | 269/152 |
| 6,024,351 | A | * | 2/2000 | Metoyer | 269/133 |
| 6,663,123 | B1 | * | 12/2003 | Kovacs | 280/79.7 |
| 7,806,394 | B2 | * | 10/2010 | Wuerthner | 269/133 |

* cited by examiner

*Primary Examiner* — Tan Le
(74) *Attorney, Agent, or Firm* — Kenneth H. Jack; Davis & Jack, LLC (57) ABSTRACT

An apparatus for holding a door, the apparatus incorporating a base, a pair of support columns, each support column among the pair of support columns having upper and lower ends, each support column among the pair of support columns being fixedly attached to the base; and a cradle mounted between the support columns, the cradle being adapted for, upon downward and upward movements of the door between the support columns, alternatively compressing against and releasing the door; the cradle including at least a first wall and being adapted for, upon the door's downward and upward movements, alternatively moving the at least first wall toward and away from the door.

16 Claims, 6 Drawing Sheets

DOOR HOLDING APPARATUS

REFERENCE TO AND CLAIM OF BENEFIT OF U.S. PROVISIONAL PATENT APPLICATION FILING

Sterling W. Condit, the named Inventor and Applicant in USPTO Provisional Patent Application No. 61/281,398 filed Nov. 16, 2009, and is one and the same person as the inventor and applicant named in the instant application. The subject matters of that provisional patent application and the instant application are substantially identical, and Sterling W. Condit claims the benefit herein of the priority and filing date of said provisional patent application. Request is made that the instant non-provisional application be accorded priority from the Nov. 16, 2009 filing of said U.S. Application No. 61/281, 398.

FIELD OF THE INVENTION

This invention relates to mechanical article holding brackets and stands.

More particularly, this invention relates to such brackets and stands which are adapted for securely holding doors or other panel structures in a substantially perpendicular orientation with respect to a floor surface.

BACKGROUND OF THE INVENTION

Carpenters who engage in the task of installing doors within door frames typically perform related tasks such as planing of a door's lateral edges, routering or chiseling hinge receiving recesses within one of the door's lateral edges, installing hinges upon one of the door's lateral edges, and drilling lock and door knob receiving cavities within and along one of the door's lateral edges. In performing such tasks, it is often desirable for the carpenter to hold, or to secure means for holding the door in an orientation where one of the door's lateral edges lies along a floor surface, and where the door is securely held with respect to the floor with its opposite lateral edge extending substantially perpendicularly upwardly.

Commonly known and utilized apparatus for holding doors in such perpendicular orientation typically present or give rise to drawbacks and disadvantages. For example, a common "U" slot door holder or stand typically insecurely holds a door and is typically incapable of accommodating doors of varying thicknesses. As a further example, utilization of saw horses, tables, and the like which are adapted to include edge clamping mechanisms often undesirably occupy such equipment which is needed simultaneously for other uses. Such clamp adapted tables and saw horses are also typically undesirably cumbersome, bulky, difficult to move, and reposition, and take up excess storage space.

The instant inventive door holding apparatus solves or ameliorates problems discussed above by providing the specialized base which supports a pair of specialized support columns. The instant invention mounts a specially movable and pivotable door receiving cradle between such columns. The provision of such specialized structures enables the inventive door holding apparatus to securely hold doors of varying thicknesses and to facilitate structural reconfiguration for compact storage.

BRIEF SUMMARY OF THE INVENTION

A first structural component of the instant inventive door holding apparatus comprises a base member. While the base member may be suitably configured as a rigid floor contacting plate or beam, the base member preferably comprises a medial section and a pair of pivotally connected foot sections. The foot sections' pivotal mounts preferably allow the foot sections to oppositely cantilever in horizontal first orientations, and to alternatively pivot upwardly for purposes of compact storage of the apparatus. Where such preferred pivoting foot base member configuration is provided, first releasable locking means are preferably associated with the base for alternatively securing the base's foot sections in first use configurations, and releasing such sections for movement to second compact storage configurations.

A further structural component of the instant inventive door holding apparatus comprises a pair of support columns. Preferably, the support columns are fixedly and rigidly attached to and extend upwardly from the base. The paired columns are preferably spaced horizontally apart over the base a distance sufficient to mount there between a door receiving cradle such as is described below. Where the base member of the door holding apparatus comprises the preferred medial and pivotally attached foot sections, the lower ends of the support columns are preferably rigidly attached to laterally opposite ends of the base's medial section. In such preferred configuration of the base member and support columns, the base member's medial section in combination with the rigidly attached support columns advantageously form and define a door cradle receiving "U" bracket.

A further structural component of the instant inventive door holding apparatus comprises a specially adapted and configured door receiving cradle which is moveably mounted and pivotably between and upon the pair of support columns. At least one wall of the door receiving cradle (and preferably two walls where the cradle comprises laterally paired walls) is mechanically adapted for moving inwardly for compressive contact with and holding of an inserted door.

Also, in the preferred embodiment, the cradle is further adapted for mechanically translating the weight of an inserted door into compressive forces applied by the cradle walls to the door for securely holding the door. In a preferred embodiment, angle slot and slide pin combinations connect walls of the cradle to the support columns, such connections achieving through the simple wedge or inclined plane machine such translation of door weight to compressive door holding force.

Where the base member of the instant invention comprises pivoting feet, as is preferred, such feet are preferably configured in the form of "C" channel beams whose channels may, upon upward pivoting of the feet to their second positions, nestingly and further compactly receive the pair of support columns.

In the instant specification and within the claims below the term "door" is intended to refer to and to broadly include all of the various types panel, plate, board, and plank articles which may be effectively received within and held by the inventive apparatus.

Accordingly, objects of the instant invention include the provision a door holding apparatus which includes and incorporates structural elements as described above, and which arranges those elements in relation to and with respect to each other in the manners described above for achievement of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
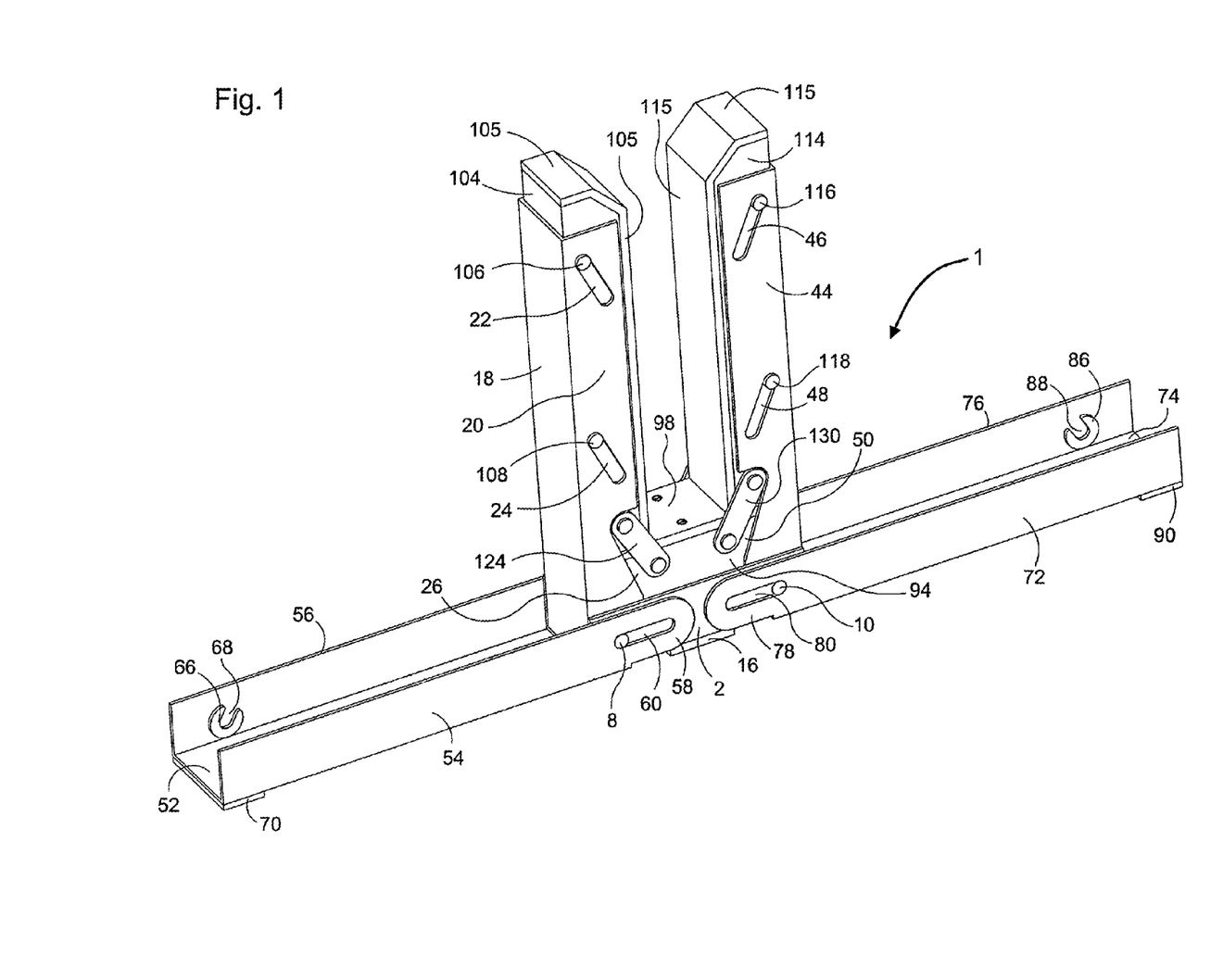
FIG. 1 is a perspective view of a preferred embodiment of the instant inventive door holding apparatus.
Figure 2:
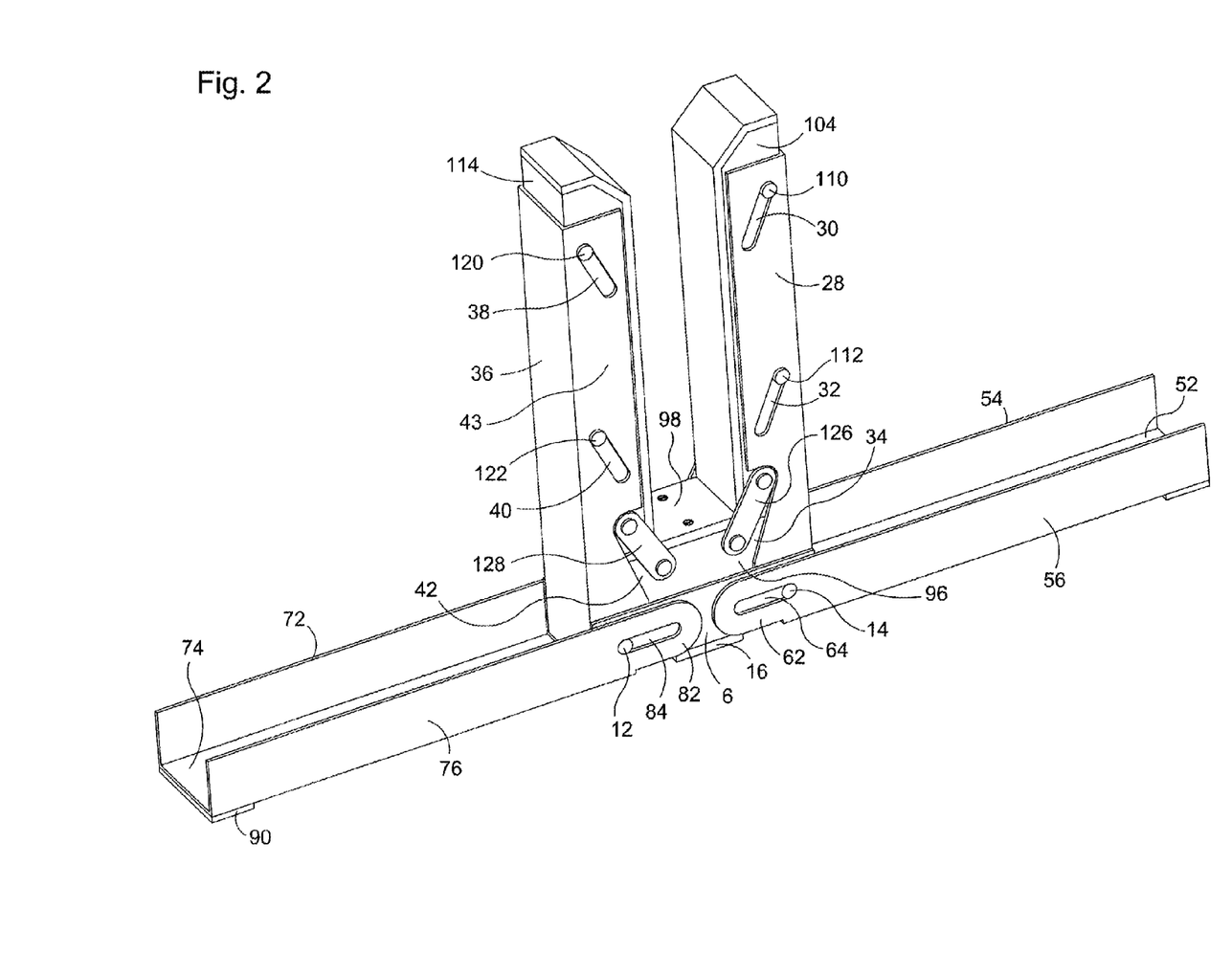
FIG. 2 is a reverse view of the structure depicted in FIG. 1.
Figure 6:
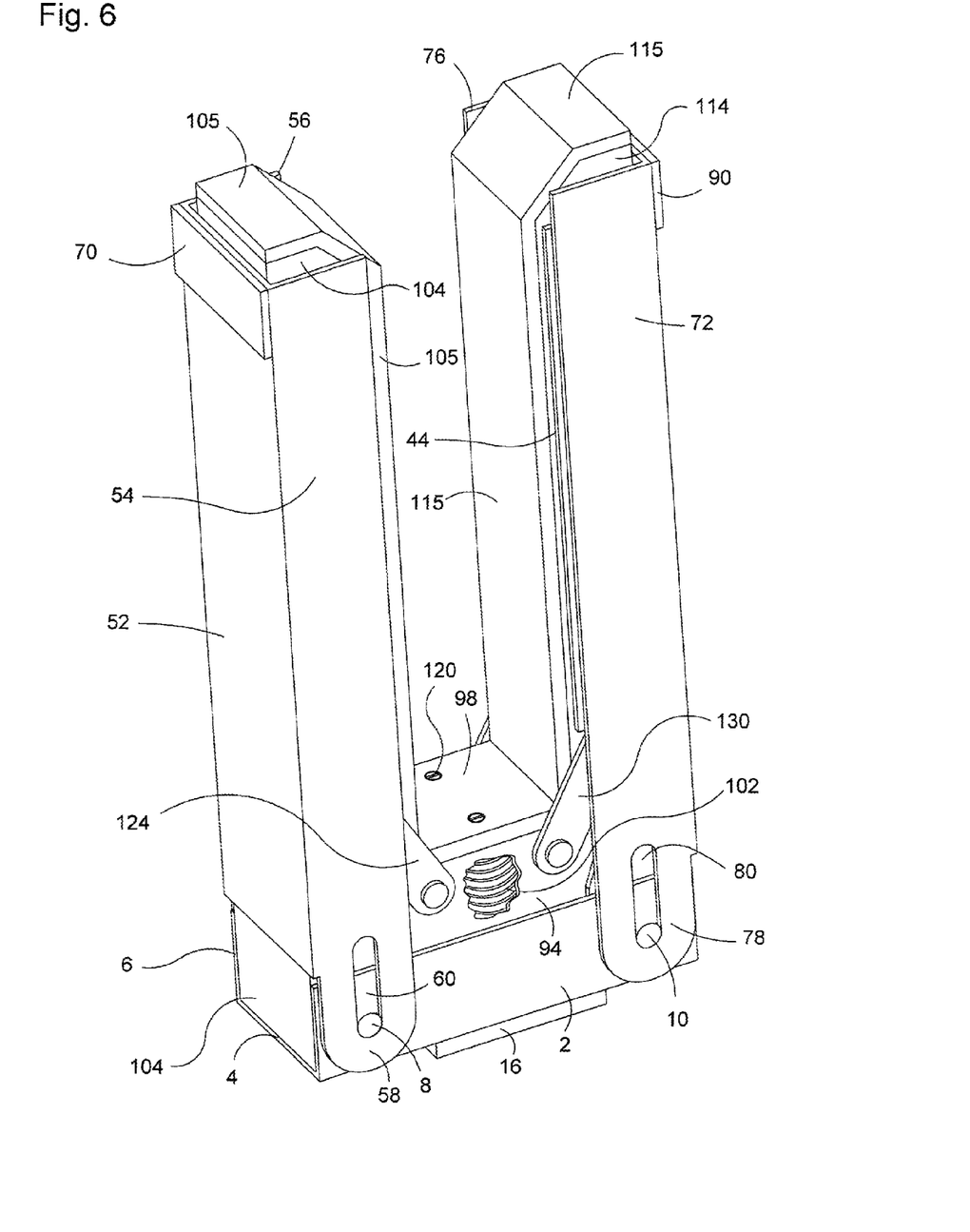
FIG. 6 shows the instant inventive door holding apparatus in its compact storage configuration.

Referring now to the drawings, and in particular simultaneously to FIGS. 1, 2, and 6, a preferred embodiment of the instant inventive door holding apparatus is referred to generally by Reference Arrow 1. The door holding apparatus 1 preferably comprises a base member which preferably includes a medial upwardly opening "C" channel beam section, such section including a longitudinal flange 2, an oppositely longitudinal flange 6, and a web 4 which spans between and interconnects lower ends of the flanges 2 and 6. In a preferred embodiment, slide pins 8 and 10 extend longitudinally from the flange 2, and slide pins 12 and 14 extend oppositely longitudinally from flange 6.

Referring further simultaneously to FIGS. 1, 2, and 6, the base member of the apparatus 1 preferably further comprises pivoting lateral and oppositely lateral feet. Like the "C" channel medial base member section described above, each of the foot members of the base is preferably configured as a "C" channel beam, the base member's lateral foot section having flanges 54 and 56 interconnected by a web 52, and the oppositely lateral foot section having flanges 72 and 76 interconnected by a web 74. The proximal ends of the foot configured base member sections are preferably adapted to present slide slots, the lateral foot section presenting slot extensions 58 and 62 which include slots 60 and 64, and the proximal end of the oppositely lateral foot section presenting slot extensions 78 and 82 which include slide slots 80 and 84. The slide slots 60, 80, 84, and 64 preferably respectively receive and retain slide pins 8, 10, 12, and 14, and such slide slots in combination with their received slide pins advantageously function as means for releasably locking the base's foot sections in their horizontally cantilevered first positions as depicted in FIG. 1.

FIG. 1 shows such releasable locking means configured for performance of an "in use" foot support locking function. Upon lateral tilting of the apparatuses' upper structures (which are further described below), the lateral end of, referring further simultaneously to FIG. 6, the medial section's "C" channel web 4 biases against the proximal end of the lateral foot's web 52, while slide pins 8 and 14 bias upwardly against the upper edges of their slots 60 and 64. Alternatively, upon oppositely lateral tilting of such upper structures, the oppositely lateral end of the web 4 counter biases against the proximal end of the oppositely lateral foot's web 74, while pins 10 and 12 bias upwardly against edges of slots 80 and 84. Thus, while the base member is configured as depicted in FIG. 1, the described releasable locking means assures that tilting of the upper structures in either the lateral or oppositely lateral direction is mechanically restricted by the base's foot sections.

Figure 5:
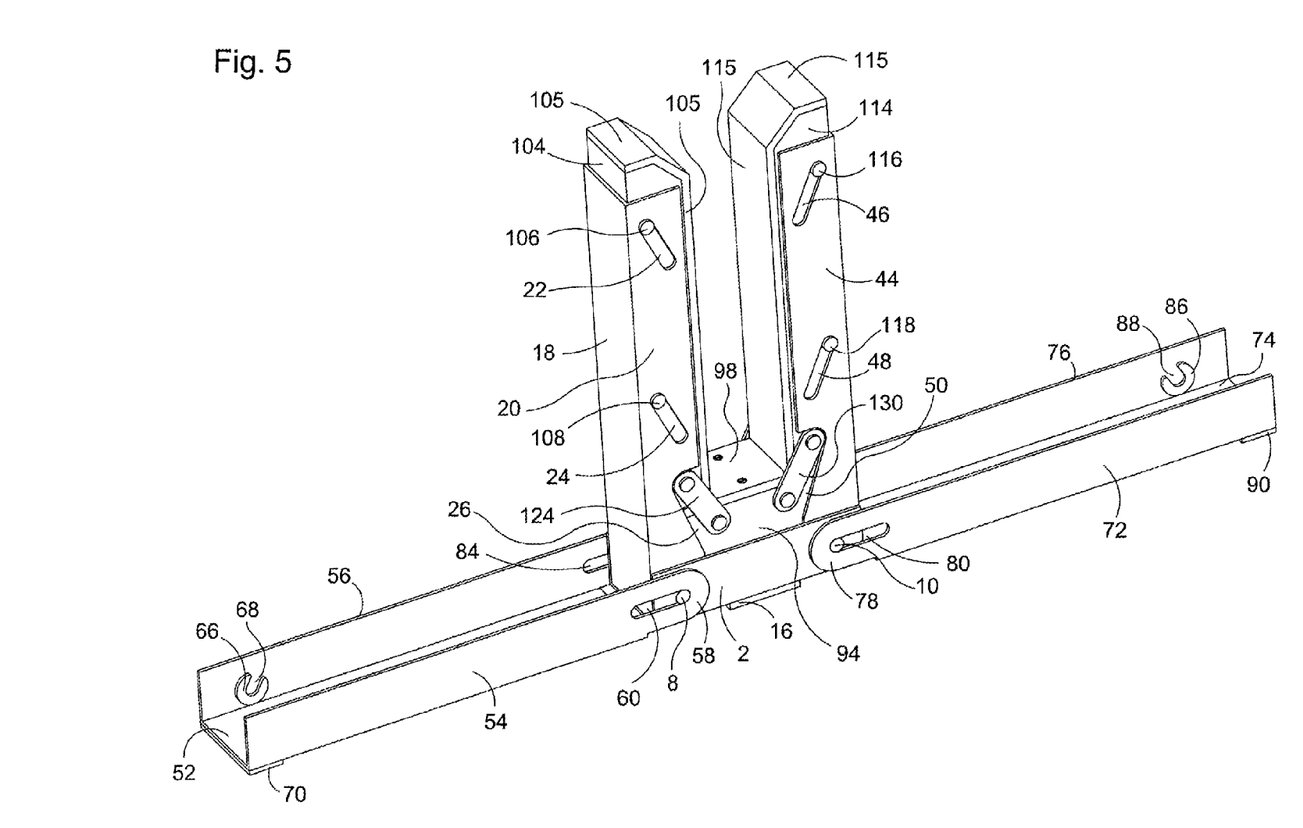
FIG. 5 alternatively redepicts FIG. 1, the view of FIG. 5 showing base member foot sections laterally and oppositely laterally moved toward disengaged positions.

Referring to FIGS. 1, 5, and 6, upon lateral and oppositely lateral sliding movements of the base member's foot sections from their horizontally retracted positions depicted in FIG. 1 to their horizontally extended positions depicted in FIG. 5, the above described pivot restricting contacts of "C" channel web members against each other is cleared or eliminated, such slidable foot sections repositioning allowing each foot section to freely pivotally move from the first horizontally extending and cantilevering use position depicted in FIG. 1 to the second upwardly extended and compact storage position depicted in FIG. 6.

The pivoting foot section base member configuration of FIGS. 1 and 2 is intended as being representative of or inclusive of rigid and non-pivoting base members which, though relatively undesirable, are considered to fall within the scope of the invention.

Referring simultaneously to FIGS. 1 and 2, paired or laterally and oppositely laterally positioned support columns are preferably fixedly and rigidly attached to the base member. The lateral support column preferably is configured as a "C" channel beam having a web 18 and having longitudinally opposed flanges 20 and 28. The lower end of the lateral support column is preferably received within the "C" channel of and is fixedly welded in place at the lateral end of the medial base section member 2, 4, 6. Flange 20 of the lateral support column preferably presents angled slide slots 22 and 24, and a pivot link clearance slot 26, and such column's longitudinally opposite flange 28 mirroringly presents angled slide slots 30 and 32, and a pivot link clearance slot 34. The oppositely lateral column is preferably mirroringly configured and mounted, such column also being "C" channel configured to include a web 36, longitudinal and oppositely longitudinal flanges 44 and 43, angled slide slots 46, 48, 38, and 40, and pivot link clearance slots 50 and 42. Accordingly, the "C" channel configured medial portion of the base member in combination with the "C" channel configured lateral and oppositely lateral support columns advantageously forms and presents a rigid "U" bracket whose arms and base advantageously present a peripheral inwardly opening cradle component mounting space.

The cradle structure which is preferably received, mounted, and contained within such peripheral "C" channel preferably comprises a vertically movable, laterally movable, and oppositely laterally movable door receiving and compressing mechanism. In the preferred embodiment of the instant invention depicted in FIGS. 1 and 2, such door receiving cradle preferably comprises a lateral wall member 104 and an oppositely lateral wall member 114, such wall members being fitted for nesting and slidable receipt within the opposing and inwardly opening "C" channel spaces defined by the lateral and oppositely lateral support columns. Slide pins 106, 108, 110, and 112 are preferably fixedly attached to and extend longitudinally and oppositely longitudinally from cradle wall 104, such pins being respectively received within angled slide slots 22, 24, 30, and 32. Slide pins 116, 118, 120, and 122 preferably similarly extend from longitudinal and oppositely longitudinal sides of cradle wall 114, such pins being respectively slidably received within angled slide slots 46, 48, 38, and 40. According to the function of the slide pin and angled slide slot combinations 106 and 22, 110 and 30, 108 and 24, 32 and 112, 116 and 46, 120 and 38, 118 and 48, and 122 and 40, upon movement of such pins to their highest positions within such slots, walls 104 and 114 are laterally and oppositely laterally displaced from each other a greatest distance for door receiving clearance. Alternatively, upon downward movement of such pins within such slots, such walls advantageously move toward each other for door holding compression.

Referring simultaneously to FIGS. 1 and 2, the door receiving cradle component of the instant inventive door holding apparatus preferably further comprises a floor member which preferably is configured as a downwardly opening "C" channel beam section, such floor member having a longitudinal flange 94, an oppositely longitudinal flange 96, and a web spanning there between, such web immediately underlying a door surface protecting pad 98. In a preferred embodiment, referring further simultaneously to FIG. 6, such protective pad 98 is fixedly attached to such "C" channel web by screws 120. The cradle floor member 94, 96, 98 is preferably fixedly and pivotably attached to the lower ends of cradle walls 104 and 114 by pivoting links 124, 126, 130, and 128.

Figure 3:
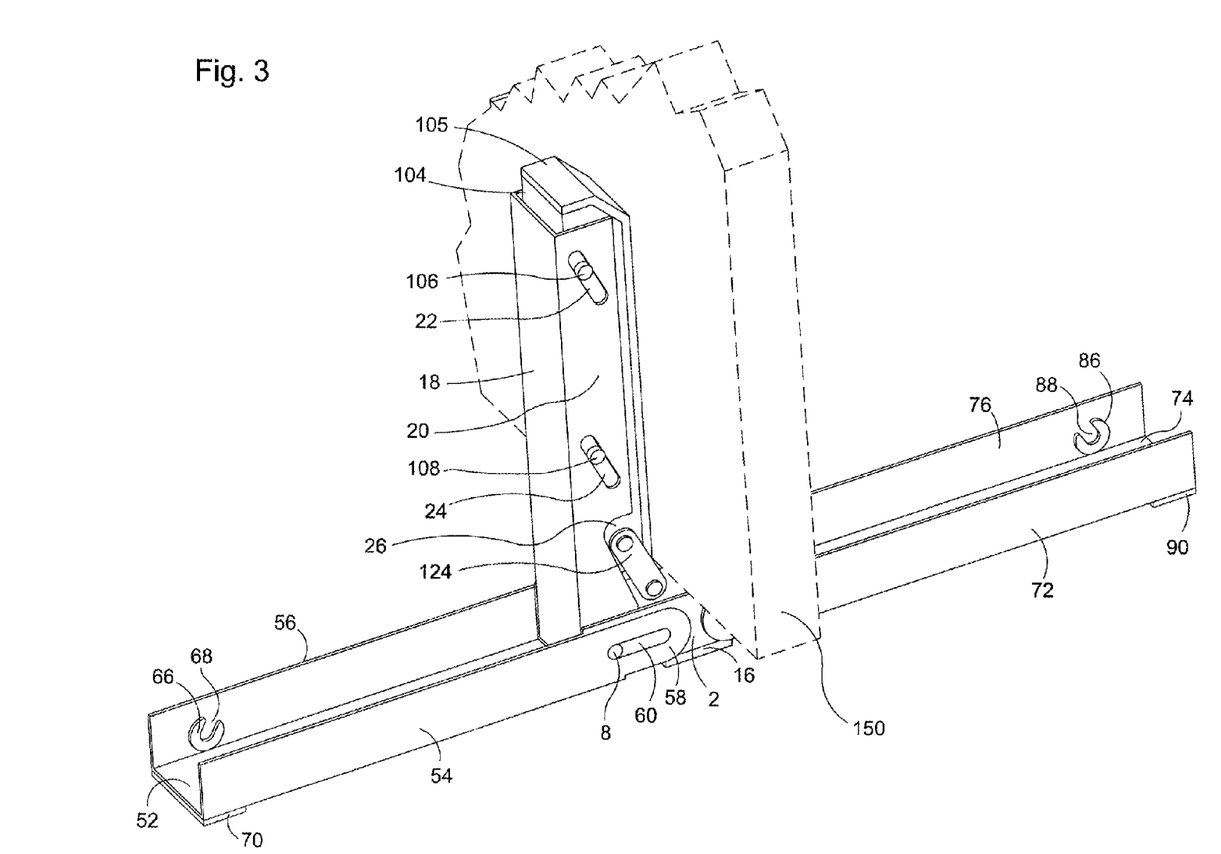
FIG. 3 redepicts FIG. 1, the view of FIG. 3 showing an exemplary door shown in dashed lines being held by the apparatus.
Figure 4:
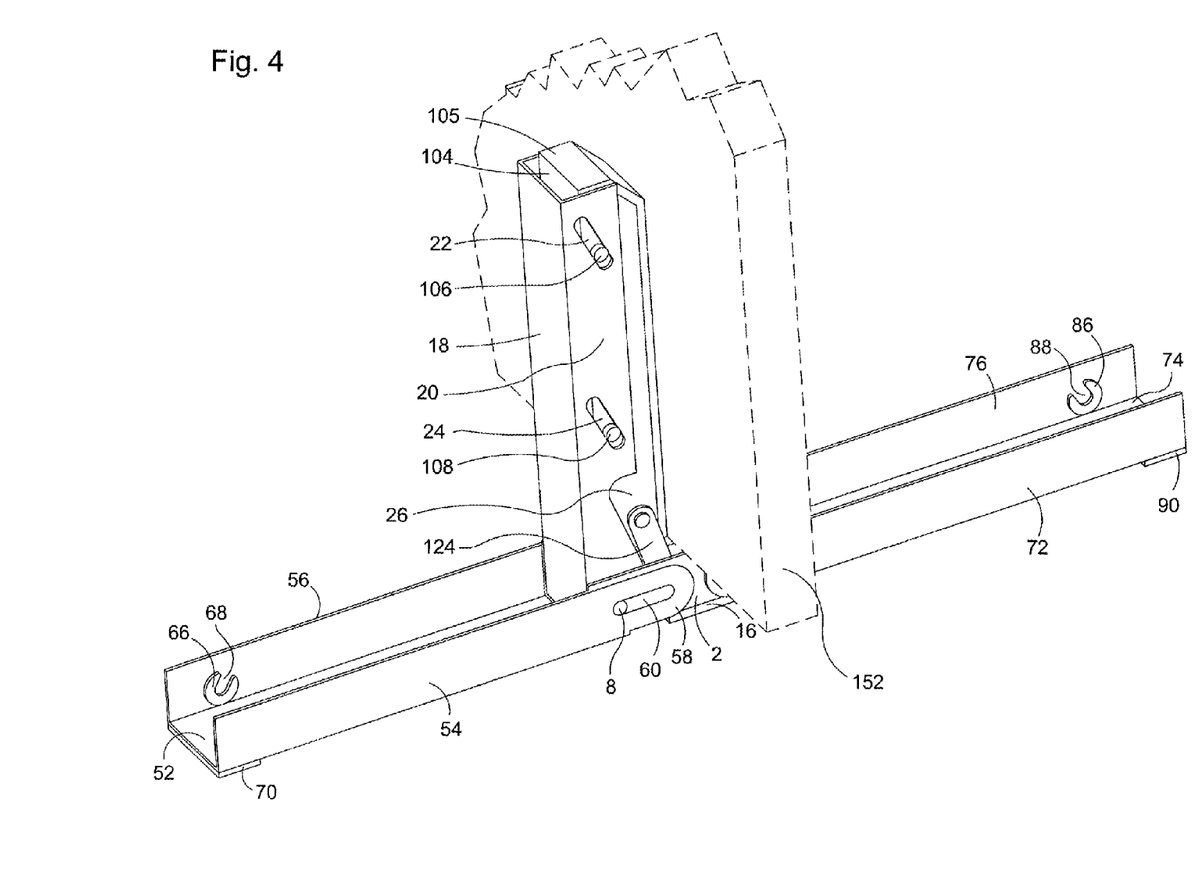
FIG. 4 redepicts FIG. 3, the view of FIG. 4 alternatively showing the door holding apparatus securely holding a different thinner door shown in dashed lines.

Referring to FIGS. 1 and 2, in use of the inventive door holding apparatus 1 configured as depicted, a carpenter may initially place the apparatus 1 upon a floor surface. In order to protect such floor surface against marring or gouging, protective cushions or pads 70 and 90 are preferably adhesively attached to the distal ends of the outer surfaces of foot section webs 52 and 74. Referring further to FIG. 6, a similar protective pad 16 attached to the lower surface of the medial section's web 4. Following placement of the apparatus 1 upon the floor, referring further simultaneously to FIG. 3, a door 150 may be inserted between cradle walls 104 and 114, and a lower lateral edge of such door 150 may be allowed to rest upon the cradle floor surface 98. Upon such door insertion and contact, the weight of the door advantageously drives the cradle floor 94, 96, 98 downwardly, and simultaneously pulls the cradle walls 104 and 114 downwardly and inwardly. The combinations of the angled paths of the slide slots 22, 24, 46, 48, 38, 40, 30, and 32, their received pins 106, 108, 116, 118, 120, 122, 110, and 112 guide and produce such motion to securely compressively hold the door 150. In order to protect the door 150 from marring or gouging upon such inwardly compression of cradle wall, cushions or compression pads 105 and 115 are preferably provided, such pads being attached to and covering contact surfaces of the walls 104 and 114. Referring further simultaneously to FIG. 4, an alternative thinner door 152 is similarly inserted, the weight of such door 152 causing walls 104 and 114 to further inwardly extend for compressive holding of such thinner door 152. The instant inventive door holding apparatus is infinitely adjustable for door holding over a range of common door thicknesses.

Referring to FIGS. 1 and 6, spring biasing means, preferably in the form of a helical spring 102, are installed within the internal space defined by the downwardly opening "C" channel of the cradle's floor member 94, 96, 98, and the upwardly opening "C" channel of the medial portion 2, 4, 6, of the base member. Such spring 102 advantageously normally upwardly positions the cradle components at the laterally outwardly and upwardly displaced cradle wall position depicted in FIG. 1. According to the function of such normally upwardly biasing spring 102, in the absence of the presence and weight of an inserted door (such as, referring to FIGS. 3 and 4, door 150 or 152), cradle walls 104 and 114 are positioned for receipt of a door having a maximum thickness. Typically such maximum thickness is 2.5"-3".

Referring simultaneously to FIGS. 1 and 5, while the instant inventive door holding apparatus 1 is not in use for door holding, the carpenter may grasp the laterally and oppositely laterally extending foot sections of the holder's base member, and may oppositely pull such members causing them to slidably move laterally and oppositely laterally from the locked use position of FIG. 1, to the disengaged position FIG. 5. Referring further to FIG. 2, during such disengaging motion, the pins 8 and 14, and 10 and 12, slide along and are guided by slots 60 and 64, and 80 and 84, and upon completion of such sliding movement, the "C" channel webs 52 and 74 advantageously laterally and oppositely laterally clear the lateral and oppositely lateral ends of the medial base member 2, 4, 6, to allow for pivoting movement of such feet from the position depicted in FIG. 1 to the second storage position depicted in FIG. 6. Preferably, the open "C" channels of such pivoting foot components of the base member are fitted for compactly nestingly receiving the lateral and oppositely lateral aspects of the support columns.

Referring simultaneously to FIGS. 1, 2, and 6, in order to securely hold the base member's lateral and oppositely lateral foot sections in their compact upwardly extended storage configurations, second removable locking means are preferably provided, such means preferably comprising brackets 66 and 86, which are preferably welded to the inner surfaces of flanges 56 and 76. Such brackets 66 and 86 preferably define pin receiving "C" slots 68 and 88, which are preferably oriented and positioned for receiving oppositely longitudinally protruding distal ends of the pins 110 and 120.

Referring simultaneously to FIGS. 1, 2, and 6, the spring 102, in addition to its above described function of normally laterally splaying the cradle walls 104 and 114 for maximal door thickness receipt, advantageously holds the pins 110 and 120 in their received positions within "C" slots 66 and 88. While such spring biased holding continues, the second releasable locking means advantageously resists movement of the feet to their first positions. In order to release such locked retention of the feet, the carpenter may simply press downwardly upon the exposed upper surfaces of walls 104 and 114, or pads 105 and 115, such pressure temporarily moving the door holding cradle downwardly against spring 102 and causing pins 110 and 120 to exit their "C" slots 68 and 88. Accordingly, application of such pressure permits the pivoting base member foot sections to downwardly pivot from the second compact storage configuration depicted in FIG. 6 to the first horizontally extended use positions depicted in FIG. 5. Upon subsequent inward sliding motions of the base member's feet from the position depicted in FIG. 5 to the position depicted in FIG. 1, such feet become locked and secured for use by the first releasable locking means, as described above.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An apparatus for holding a door, the apparatus comprising:
   (a) a base;
   (b) a pair of support columns, each support column among the pair of support columns having upper and lower ends, each support column among the pair of support columns being fixedly attached to the base; and
   (c) a cradle mounted between the support columns, the cradle being adapted for, upon downward and upward movements of the door between the support columns, alternatively compressing against and releasing the door, the cradle comprising first and second walls and a vertically movable floor connected operatively to the first and second walls, the cradle being adapted for, upon the door's downward and upward movements, alternatively moving the first and second walls toward and away from the door; the cradle's adaptations for alternatively moving the first and second walls comprising a plurality of angle slot and slide pin combinations, each combination among said plurality of combinations interconnecting one of the walls among the cradle's first and second walls and one of the columns among the pair of support columns.

2. The apparatus of claim 1 further comprising spring biasing means connected operatively to the cradle, the spring biasing means being adapted for normally upwardly moving the door receiving cradle.

3. The door holding apparatus of claim 2 wherein the spring biasing means comprises a helical spring spanning between the base and the cradle's floor.

4. The apparatus of claim 3 wherein the operative connections of the first and second walls to the vertically moveable floor comprise a plurality of pivot links.

5. The apparatus of claim 1 wherein each column among the pair of support columns comprises a vertically extending channel, each of support column's vertically extending channel opening toward the other support column's vertically extending channel.

6. The apparatus of claim 5 wherein each of the support columns' vertically extending channels has opposing walls, and wherein each of the angle slots among the plurality of angle slot and pin combinations opens at one of said opposing walls.

7. The apparatus of claim 6 wherein each slide pin among the plurality of slide pin and angle slot combinations is fixedly attached to one of the walls among the cradle's first and second walls.

8. The apparatus of claim 7 wherein the cradle further comprises a pair of compression pads connected operatively to the cradle's at least first and second walls.

9. The apparatus of claim 1 wherein the base comprises a medial section and a pair of foot sections, and wherein the base further comprises pivotal mounting means connecting each foot section to the base's medial section.

10. The apparatus of claim 9 wherein the pivotal mounting means are adapted for facilitating movements of the base's foot sections between first and second positions, the foot sections oppositely cantilevering from the support columns' lower ends upon movements to their first positions, the foot sections extending along the support columns upon movement to their second positions.

11. The apparatus of claim 10 wherein the pivotal mounting means is further adapted for releasably locking the foot sections at their first positions.

12. An apparatus for holding a door, the apparatus comprising:
(a) a base comprising a medial section and a pair of foot sections, the base further comprising pivotal mounting means connecting each foot section to the base's medial section;
(b) a pair of support columns, each support column among the pair of support columns having upper and lower ends, each support column among the pair of support columns being fixedly attached to the base; and
(c) a cradle mounted between the support columns, the cradle being adapted for, upon downward and upward movements of the door between the support columns, alternatively compressing against and releasing the door; the pivotal mounting means being adapted for facilitating movements of the base's foot sections between first and second positions, the foot sections oppositely cantilevering from the support columns' lower ends upon movements to their first positions, the foot sections extending along the support columns upon movements to their second positions; the pivotal mounting means being adapted for releasably locking the foot sections at their first positions, the pivotal mounting means' releasably locking adaptation comprising a plurality of pin and slide slot combinations.

13. The apparatus of claim 12 wherein each of the base's foot sections comprises a column receiving channel, each foot section's column receiving channel being fitted for, upon movement of said each foot section to its second position, nestingly receiving one of the support columns.

14. The apparatus of claim 13 further comprising second releasably locking means connected operatively to the base's foot sections, the second releasably locking means being adapted for, upon positioning of the base's foot sections at their second positions, resisting movement of the base's foot sections toward their first positions.

15. The apparatus of claim 14 wherein the cradle is adapted for upward and downward movements with respect to the support columns, and wherein the second releasably locking means is further adapted for, upon the positioning of the base's foot sections at their second positions and upon a downward movement of the cradle, permitting movement of the base's foot sections toward their first positions.

16. The door holding apparatus of claim 15 wherein the second releasably locking means comprises a plurality of "C" slot and pin combinations.

* * * * *